(12) United States Patent
Strait et al.

(10) Patent No.: US 6,763,061 B1
(45) Date of Patent: Jul. 13, 2004

(54) FREQUENCY DOMAIN TECHNIQUE FOR NARROWBAND NOISE CANCELLATION IN DMT RECEIVERS

(75) Inventors: Jeffrey C. Strait, Nevada City, CA (US); Eugene T. Sy, Cupertino, CA (US)

(73) Assignee: 3Com Corporation, Santa Clara, CA (US)

( * ) Notice: Subject to any disclaimer, the term of this patent is extended or adjusted under 35 U.S.C. 154(b) by 732 days.

(21) Appl. No.: 09/628,842

(22) Filed: Jul. 31, 2000

(51) Int. Cl.$^7$ .............................................. H04B 1/10
(52) U.S. Cl. ...................................................... 375/219
(58) Field of Search ................................ 375/219, 148, 375/229, 232, 295, 316, 227, 224, 285, 346, 348, 350, 140, 144, 147, 341; 708/300, 322

(56) References Cited

U.S. PATENT DOCUMENTS

| | | | | |
|---|---|---|---|---|
| 5,729,558 A | * | 3/1998 | Mobin | 371/43 |
| 6,003,051 A | * | 12/1999 | Okazaki | 708/3 |
| 6,061,393 A | * | 5/2000 | Tsu et al. | 375/224 |
| 6,266,367 B1 | * | 7/2001 | Strait | 375/229 |
| 6,269,131 B1 | * | 7/2001 | Gothe et al. | 375/346 |
| 6,289,047 B1 | * | 9/2001 | Agazzi et al. | 375/232 |
| 6,438,161 B1 | * | 8/2002 | Farhang-Boroujeny et al. | 375/229 |
| 6,529,559 B2 | * | 3/2003 | Reshef | 375/262 |
| 6,542,562 B1 | * | 4/2003 | Ostberg et al. | 375/350 |
| 6,549,512 B2 | * | 4/2003 | Wu et al. | 370/210 |
| 6,608,864 B1 | * | 8/2003 | Strait | 375/233 |
| 6,618,451 B1 | * | 9/2003 | Gonikberg | 375/341 |
| 6,625,235 B1 | * | 9/2003 | Coker et al. | 375/341 |

OTHER PUBLICATIONS

M. V. Clark, "Adaptive Frequency–Domain Equalization and Diversity Combining for Broadband Wireless Communications", IEEE Journal on Selected Areas in Communications, vol. 16, No. 8, Oct. 1998, pp. 1385–1395.*

* cited by examiner

Primary Examiner—Bayard Emmanuel
Assistant Examiner—Dung X Nguyen
(74) Attorney, Agent, or Firm—McDonnell Boehnen Hulbert & Berghoff (57) ABSTRACT

The system and method of the preferred embodiments may be directed to improving the signal-to-noise ratio in frequency spectrum regions where narrowband interference may be present. The system and method of the preferred embodiments includes reducing the narrowband interference by determining a noise estimate. In accordance with the noise estimate and output of a frequency domain equalizer, a noise-cancelled output may be obtained.

5 Claims, 5 Drawing Sheets

FREQUENCY DOMAIN TECHNIQUE FOR NARROWBAND NOISE CANCELLATION IN DMT RECEIVERS

FIELD OF THE INVENTION

This present invention relates to reducing the effect of narrowband noise in a multi-carrier transmission system.

BACKGROUND OF THE INVENTION

In today's modern world, businesses and residential users are demanding faster network access to the Internet. The high demand for faster network access is putting pressure on vendors and service providers to choose network transmission technologies that will satisfy the emerging demand. The choice of network transmission technologies is critical since it may affect service, cost, and ultimately vendor/service provider success.

Many of the vendors and service providers have chosen to pursue digital subscriber line (DSL) technology and more specifically asymmetrical DSL (ADSL) for providing fast Internet access to business and residential users. ADSL often provides high-speed data transmission over standard telephone lines while maintaining voice traffic on the same lines. ADSL may be seen as a cost-effective alternative to other network transmission technologies.

ADSL technology often exploits the relatively high bandwidth of copper loops by converting twisted-pair copper telephone wires into paths for multimedia, data communications, and Internet access. Typically, ADSL supports 1.544 to 6 Mbps transmission downstream and 640 kb/s upstream. ADSL service may be provided by connecting a pair of modems, one often located in the telephone company's central office (CO) and the other located at the customer premises, over a standard telephone line.

An ADSL modem utilizing ANSI appointed discrete multitone ("DMT") as the modulation scheme segment the frequency spectrum on a copper line into 256 channels. Each 4 kHz channel is capable of carrying up to 15 data bits according to the American National Standards Institute (ANSI) Standard T1.413, the contents of which are incorporated herein by reference. A similar standard, Recommendation G.992.1 from the ITU, is also incorporated herein by reference. A variation of the standard that accommodates POTS service without the use of a signal splitter is set forth in specification G.lite, or Recommendation G.992.2, the contents of which are incorporated herein by reference.

During channel analysis, a wide-band test signal sent over the 256 channels is transmitted from the ADSL terminal unit ("ATU-C") at the CO to an ADSL remote terminal unit ("ATU-R") at the customer premises. The ATU-R measures and updates the noise content of each of the channels received and then determines whether a channel has sufficient quality to be used for further transmission. Depending on the quality, the ATU-R may instruct the ATU-C how much data this channel should carry relative to the other channels that are used. Often, this procedure maximizes performance and minimizes error probability at any data specific rate. For instance, with a DMT modem, bit distribution may avoid noise by not loading bits onto channels that are corrupted by AM radio interference. The DMT modem may also lower bit distribution at the frequencies where notching occurs.

However, there are nearly 5,000 AM radio stations licensed in the U.S. to broadcast at frequencies between 540 kHz and 1.7 MHz. Unfortunately, ADSL service providers use the frequencies between 138 kHz and 1.1 MHz to download and upload data. This sizeable overlap (i.e., 560 kHz of bandwidth) can cause conflict because AM radio and ADSL try to use the same electromagnetic frequencies at the same time. Thus, as explained earlier, ADSL modems typically stop using the segment of the frequency spectrum occupied by any nearby AM stations. When an AM signal interferes with a carrier, a current remedy is to stop using that carrier and consequently reduces the bandwidth and data throughput.

Additionally, the longer a wire is from the central office to the remote terminal, the more susceptible the ADSL line is to interference as the signal gets weaker as it travels down the wire. The effect is particularly pronounced if the AM transmitter is near the remote terminal at the end of a long wire.

Interference caused from AM radio stations is part of a group commonly referred to as narrowband interference. Narrowband interference includes a signal whose essential spectral content may be contained within a voice channel on nominal 4-kHz bandwidth such as found in Amateur radio, AM, and FM radio signals. For instance, consider an AM transmission occurring at the frequency of 1070 kHz. If an ADSL signal is at the same frequency in a wire, then the ADSL receivers at the end of the wire may pick up the AM signal at 1070 kHz. To avoid this interference, data is simply not transmitted on that particular frequency thus also reducing possible throughput of the communication channel. This technique is currently used by the modulation standard of ADSL T1.413.

Thus, there is a need to reduce narrowband interference to increase throughput in a multi-carrier communications.

SUMMARY OF THE INVENTION

The system and method of the preferred embodiments may be directed to improving the signal-to-noise ratio in frequency spectrum regions where narrowband interference may be present. The system and method of the preferred embodiments includes reducing the narrowband interference by determining a noise estimate. In accordance with the noise estimate and output of a frequency domain equalizer, a noise-cancelled output may be obtained.

In accordance with one aspect of the present invention, a method for improving the signal-to-noise ratio in frequency spectrum regions where narrowband interference may be present includes the step of receiving at least one decoder error for the at least one carrier. Then, the step of determining at least one adaptive filter tap for each of the at least one carrier in relation to the received decoder error(s). The step of forming a noise estimate relating to the decoder error(s) and the adaptive filter tap(s). Then the step of receiving an FEQ output in relation with a frequency domain equalizer. Finally, the step of determining a signal having increased signal-to-noise ratio in response to the noise estimate and the FEQ output.

In accordance with another aspect of the present invention, a device for increasing a signal-to-noise ratio for at least one carrier in a multicarrier transceiver includes a canceller and a symbol storage unit. The canceller receives at least one decoder error for the at least one carrier and an FEQ output in relation with a frequency domain equalizer. The symbol storage unit stores the at least one decoder error. The canceller may then determine at least one adaptive filter tap for each of the at least one carrier in accordance with the at least one stored decoder error and forms a noise estimate relating to the at least one decoder error and the adaptive filter tap(s).

In a preferred embodiment, the reduction of narrowband interference is performed by a DMT receiver utilizing ADSL protocol. In another preferred embodiment, the receiver utilizes DSL protocol and any DSL variation protocol such as ADSL, very high data-rate DSL ("VDSL"), high bit-rate DSL ("HDSL"), and rate-adaptive DSL ("RADSL").

The foregoing and other objects, features and advantages of the system and method for reducing narrowband interference will be apparent from the following more particular description of preferred embodiments of the system and the method as illustrated in the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

The system and method of the preferred embodiments is directed to improving the signal-to-noise ratio in frequency spectrum regions where narrowband interference may be present. The system and method of the preferred embodiments includes reducing the narrowband interference by determining a noise estimate. In accordance with the noise estimate and output of a frequency domain equalizer, a noise-cancelled output may be obtained.

The system and method including a discrete multi-tone receiver ("DMT receiver") have been implemented in a communication system compatible with ADSL transmission protocols, as set forth in ANSI specification T1.413. However, the receiver and method may be well suited for other multi-carrier, discrete multi-tone, or orthogonal frequency division modulation ("OFDM") systems.

In a digital transmission system preferably providing ADSL service, a DMT transceiver at a central office ("CO") is interfaced with a variety of digital services such as telephony, video-on-demand, video conferencing, and the Internet. The DMT transceiver located at the CO referred to as the ADSL transmission central office unit ("ATU-C") relays the variety of services in the form of data to a DMT transceiver located at a customer's premise such as a home or business location. The DMT transceiver at the customer's premise or remote terminal ("RT") is referred to as the ADSL transmission remote unit ("ATU-R"). The ATU-R may be connected to a computer or other application device such as a TV, audio equipment, and less intelligent devices (i.e., thermostats, kitchen appliances, etc.). The ATU-C and the ATU-R typically connected together over a telephone line preferably transmit and receive data.

Figure 1:
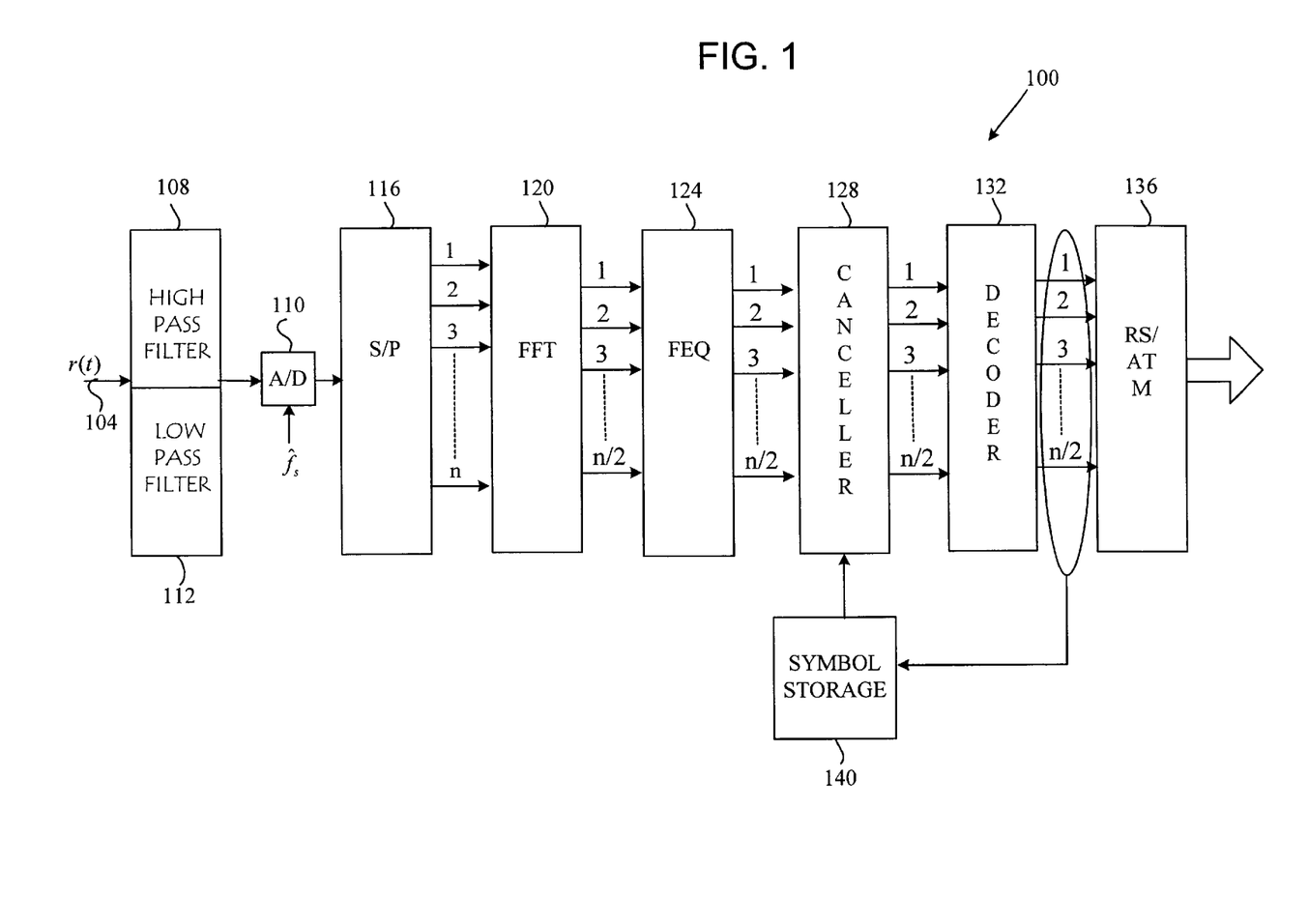
FIG. 1 is a diagram illustrating an exemplary receiver of the preferred embodiments.

FIG. 1 illustrates an exemplary receiver 100 located at the RT utilizing the method and device of a preferred embodiment. The receiver 100 may be combined with a transmitter (not shown) to form a DMT transceiver or an ATU-R. It should be understood that the receiver 100 may include less or more elements such as a time domain equalizer (TEQ), echo canceller, and may include more or less filters.

The receiver 100 receives an analog signal r(t) that has been transported over a communication channel 104 typically from an ATU-C, ATU-R, or any other DMT transceiver. The analog signal r(t) may pass through a high pass filter 108 to provide frequency band separation, additional noise rejection, and/or pre-emphasis filtering. Pre-emphasis filtering preferably equalizes the frequency spectrum and may be performed by a hardware filter or with a software operation. In either case, gain may be accomplished for all frequencies in a range of pre-selected frequencies. Furthermore, the analog signal r(t) may pass through an anti-aliasing, low pass filter 112 prior to sampling. It should be understood that the preferred embodiments are not to be limited by the number of filters shown in the receiver 100. For instance, a pre-filter may be utilized to reject, or "filter out" any acoustic energy above the highest frequency of interest.

The receiver 100 preferably demodulates the signal r(t) at a rate $\hat{f}s$. The rate $\hat{f}s$ is an estimated sampling rate utilized by the analog to digital converter ("ADC") 110 preferably matching the rate of data sent out of the digital to analog converter ("DAC") utilized in a transmitter. The sampling rate preferably reduces synchronization errors thus reducing signal attenuation and phase rotation.

The receiver 100 may then process the demodulated signal (i.e., digital samples) by converting the samples from a serial fashion into a parallel fashion and removing a cyclic extension (if the cyclic extension was previously added onto the signal). Typically, the conversion of data into the parallel fashion is performed by a serial-to-parallel converter 116 ("S/P converter"). The cyclic prefix may be added at the transmitter (not shown) by taking samples from an end of a data block and copying the samples to the beginning of the symbol. The cyclic prefix may then operate as a guard space between neighboring transmit symbols in the time domain thus combating intersymbol interference ("ISI") efficiently in the time domain. Additionally, the periodicity of the transmitted signal, due to the cyclic prefix, enables cyclic convolution between the channel impulse response and the transmitted signal is then simulated. Thus, the channel effect is reduced to an element-by-element multiplication between the Fourier transforms of the channel impulse response and the transmitted signal, therefore introducing only different gains and delays on each carrier. These different gains and phases may be handled by a one-tap per channel equalizer (soon described in more detail) thus reducing or eliminating inter-carrier interference ("ICI"). The cyclic prefix is preferably used in the data transfer between a transmitter and the receiver 100, but the preferred embodiment is not limited to utilizing the cyclic prefix. Other methods for reducing ISI and ICI known in the art may be utilized.

The incoming serial stream of samples is converted into blocks of parallel data with N parallel values. These are fed into an N-point FFT module 120, therefore transferring the time domain signal again into the frequency domain. The transfer into the frequency domain may also mean the separation of the N/2 parallel independent carriers whose contents can now be further processed on a per bin basis. One of the N/2 outputs is commonly referred to as a bin, where the FFT module 120 outputs may then output N/2 number of bins.

A frequency-domain equalizer ("FEQ") 124 performs one-tap per channel equalization by multiplying the FFT outputs with a single complex tap. Typically, the FEQ 124 adaptively scales each subchannel by the inverse of the channel gain and phase so that a common decision boundary may be used in decoding the received data. The channel gain and channel phase typically result from the copper line between the ATU-C (not shown) and the receiver 100 distorting the signal amplitude and phase, a distortion that changes from carrier to carrier. The frequency equalizer is designed to correct this channel attenuation and phase shift. The FEQ rotates the received constellation at each tone for channel phase compensation and increases the received amplitude in order to correct loop attenuation. It should be understood that the receiver 100 might utilize any equalizer that performs the equivalent to the FEQ.

The resulting output of the FEQ 124 may then be processed by a canceller 128. Canceller 128 may reduce noise on individual bins containing signals sent by a transmitting DMT transmitter. Canceller 128 may be activated on a bin if the correlating carrier is subjected to narrowband noise interference such as AM radio, FM radio, and/or any signal whose essential spectral content may be contained within a voice channel on nominal 4-kHz bandwidth. To determine if canceller 128 should be activated, the signal-to-noise ratio is measured on each bin and the bins with the smallest signal-to-noise ratio are candidates for narrowband interference cancellation. In addition, dips or nulls in the signal-to-noise distribution may be used to identify bins subjected to narrowband interference. Canceller 128 may reject and or compensate for the interference thus preferably enhancing data throughput over the transmission channel 104. Data throughput is preferably enhanced because a particular bin experiencing narrowband noise interference may be utilized in data transfer (with noise cancellation) and is not deactivated due to the noise interference. It should be understood, however, that additional methods known in the art may be used to determine if a bin or group of bins are experiencing narrowband interference.

Symbol storage 140 may be utilized to store decoder 132 outputs including canceled outputs (canceled outputs are direct outputs from the decoder 132) or uncanceled decoder outputs (uncanceled outputs are outputs from the decoder 132 with an added noise estimate. Symbol storage 140 may include RAM, hard disk, EEPROM, ROM, etc. If noise cancellation is necessary, the canceller 128 may utilize information from a decoder 132 and the outputs of the FEQ 124. Additional processing may be performed on the output of the decoder 132 such as Reed Solomon coding and ATM decoding 136. It should be understood that the receiver 100 is not limited to that shown in FIG. 1, it may include more or less elements such as additional filters, a means for echo cancellation, a time domain equalizer, etc.

Figure 2:
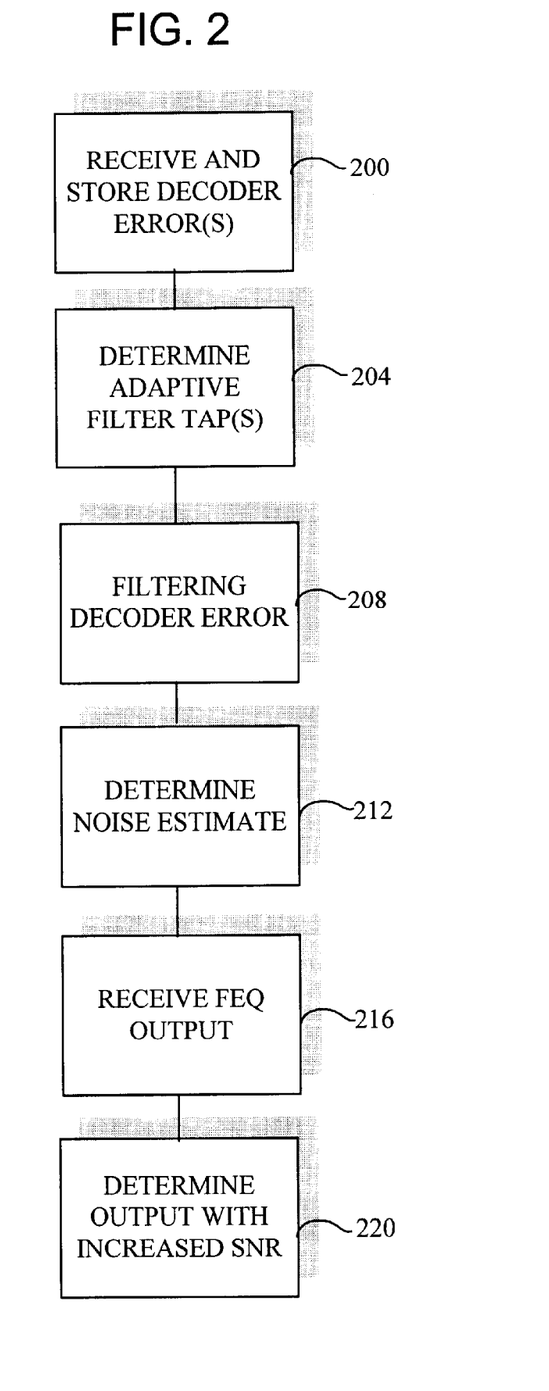
FIG. 2 is a flow diagram illustrating a preferred embodiment of a method for reducing narrowband interference in accordance with the preferred embodiments.

FIG. 2 illustrates a top-level flow diagram of an embodiment for rejecting and or compensating for narrowband interference. The system and method shown in FIG. 2 may be applied to a canceller 128 including a symbol storage unit 140. The system and method may be applied in the form of executable software read by the canceller 128 from a memory device such as ROM, RAM, EEPROM, hard disk, etc. Additionally, the system and method shown in FIG. 2 may be applied in the form of active, passive, and/or logic devices such as comparators, shift registers, adders etc.

Figure 3:
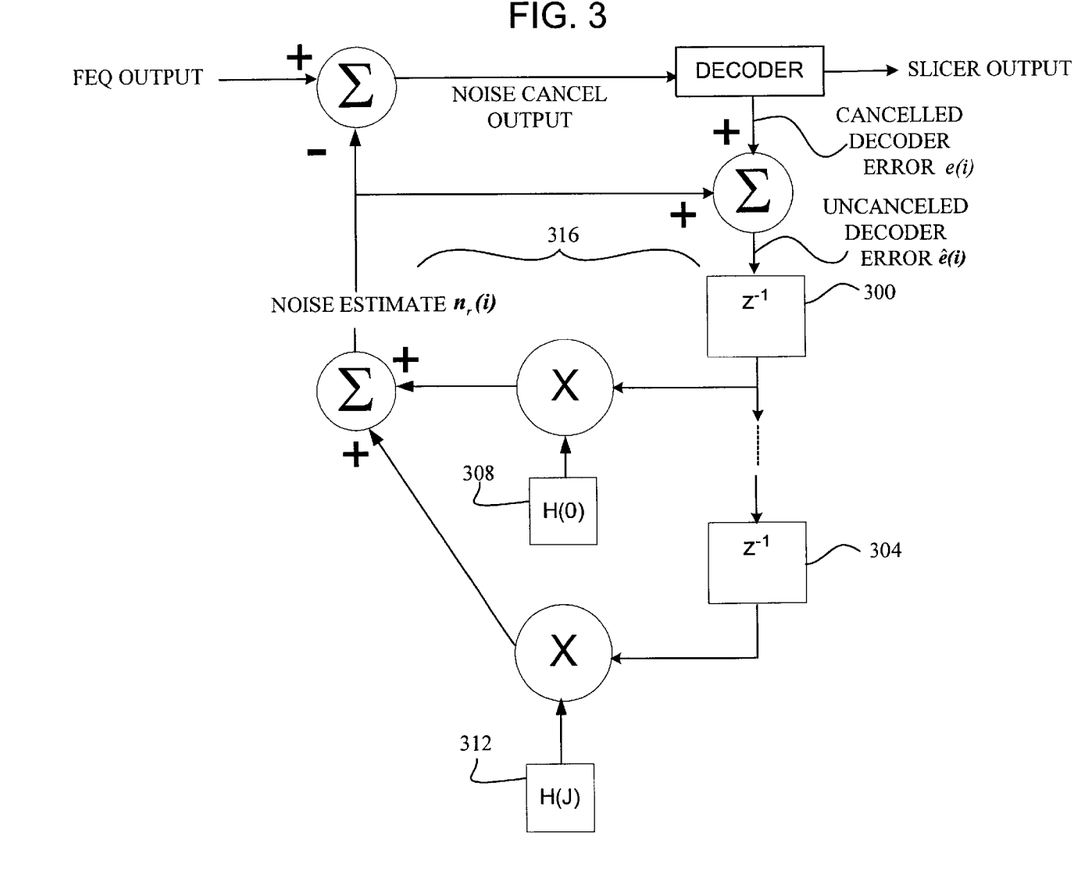
FIG. 3 is a diagram illustrating an exemplary execution of the method in FIG. 2

The system and method for reducing narrowband interference in accordance with the preferred embodiments includes receiving and storing at least one decoder error 200 originating from a decoder (132 in FIG. 1). In FIG. 3, the decoder error including a canceled decoder error or an uncanceled decoder error may be either stored or equivalently delayed for a predetermined amount of time (FIG. 3 shows delayed uncanceled decoder errors). The decoder errors may be stored in the symbol storage (140 in FIG. 1) as represented by the delays 300,304. The number of decoder errors stored may be related to the desired size of the adaptive filter. For instance, one decoder error might be stored and utilized for a one-tap filter; J decoder errors might be stored and utilized for a J-tap filter. The decoder error(s) may include slicer errors such as caused by a phase shift in a constellation of symbols. It should be noted that the canceled error may be utilized instead of the uncanceled error, but convergence of the adaptive filter taps may be slower.

The method further includes the step 204 of determining adaptive filter taps. The adaptive filter taps 308,312, such as shown in FIG. 3, may be initially calculated during the MEDLEY phase of initialization to minimize either the sum of squared errors over M symbol periods and/or, the mean squared error ("MSE"). The MEDLEY stage includes estimation at the ATU-R of the downstream signal-to-noise ratio ("SNR") (that is, the SNR of the signal from the ATU-C to the ATU-R).

The filter taps may be continuously adjusted during receiver 100 operation. The least means square ("LMS") may be utilized to update the filter taps which may minimize the MSE given by the relation: $\xi = E\{(x(i)-f(n)y(i)+h_k*\hat{e}(i))^2\}$ where x(i) is a known transmitted symbol such as during receiver training and/or the decision for the current constellation during showtime (showtime is the steady state signaling state), where f(n) is the FEQ coefficient corresponding to the nth bin, where y(i) is the FFT output of the corresponding nth bin, and where $h_k*\hat{e}(i)$ is the finite impulse response ("FIR") or infinite impulse response ("IIR") filtering of the uncanceled decoder error $\hat{e}(i)$ with filter coefficients $h_k$. Coefficients $h_k$ may include one coefficient (shown as H(0) 308 in FIG. 3) or up to J coefficients (shown as H(J) 312 in FIG. 3) and may be given by the relation: $h_k=[h_0, h_1+ \ldots h_{j-1}]$ where k is an index counter. Uncanceled decoder error $\hat{e}(i)$ is the uncanceled decoder error for the symbol i of a total J symbols and may be given by the relation: $\hat{e}(i)=[\hat{e}(i-1),\hat{e}(i-2), \ldots ,\hat{e}(i-J)]$. The Uncanceled decoder error may be found in part from the canceled decoder error e(i) and from the noise estimate $n_r(i)$. It should be noted that the canceled error may be utilized instead of the uncanceled error, but convergence of the adaptive filter taps may be slower. To use the canceled error, the canceled decoder error e(i) may be substituted for the uncanceled decoder error $\hat{e}(i)$ in any of the relationships described herein.

To minimize the MSE, the adaptive filter taps may be determined in accordance with the relation: $h_{k+1}=h_k-\alpha(x(i)-f(n)y(i)+h_k*\hat{e}(i))\mathrm{conj}(\hat{e}(i))$, x(i) is a known transmitted symbol such as during receiver training and/or the decoder decision for the current constellation during showtime, where f(n) is the FEQ coefficient corresponding to the nth bin, where y(i) is the FFT output of the corresponding nth bin, where $h_k$ is the current tap, where $\alpha$ is the corrective coefficient, where $h_k*\hat{e}(i)$ is the filtering of the constellation error $\hat{e}(i)$ with filter coefficients $h_k$, and where $\mathrm{conj}(\hat{e}(i))$ is the complex conjugate of the input signal to the filter which appears in the LMS adaptive update term for the symbol i of a total J symbols. The corrective coefficient may be calculated during the R_REVERB3 stage of receiver initialization (R_REVERB3 is a latter stage of receiver initialization typically used to measure the upstream power, adjust receiver gain control, synchronize the receiver, and train the FEQ). Additionally, it may be possible to determine the corrective coefficient concurrently with the training of the FEQ (124 in FIG. 1).

In another embodiment, a single tap predictor may be utilized to determine a tap and is found in accordance with the relation:

$$h_{k+1} = \alpha h_k + (1-\alpha)\frac{\hat{e}(i)}{\hat{e}(i-1)}$$

where $\alpha$ is the corrective coefficient, where $h_k$ is the adaptive filter tap for symbol i, and where ê(i) is the uncanceled decoder error for the symbol i. The single tap predictor provides an estimate of the current interface component by rotating and scaling the previous slicer error. It may be updated with past rate-of-change information (that is, the uncanceled decoder error rate of change) in an attempt to whiten the current slicer error.

The uncanceled decoder error(s) is filtered per step 208 to create a noise estimate per step 212. The noise estimate (shown because of filtering 316 the uncanceled decoder error(s) in FIG. 3) may be determined in accordance with the relationship:

$$n_r(i)=h_0\hat{e}(i-1)+h_1\hat{e}(i-2)+ \ldots +h_{J-1}\hat{e}(i-J)=h_k*\hat{e}(i)$$

where $\hat{e}(i)=[\hat{e}(i-1),\hat{e}(i-2), \ldots ,\hat{e}(i-J)]$, and where $h_k=[h_0, h_1, \ldots ,h_{J-1}]$. The uncanceled decoder error(s) may be filtered use any available filtering technique such as finite impulse response ("FIR") or infinite impulse response ("IIR") filters.

Further, a received FEQ output of the nth bin per step 216 is combined with the noise estimate for the corresponding nth bin to create a canceller output 220 for the nth bin preferably with an increased signal-to-noise ratio.

It should be understood that the exemplary flow diagram provided in FIG. 2 and the exemplary block diagram in FIG. 3 are not limited to the steps shown and that other steps while remaining within the scope of the invention may be utilized. Furthermore, the steps may not have to be performed in the order as shown in FIG. 2 and 3.

Figure 4:
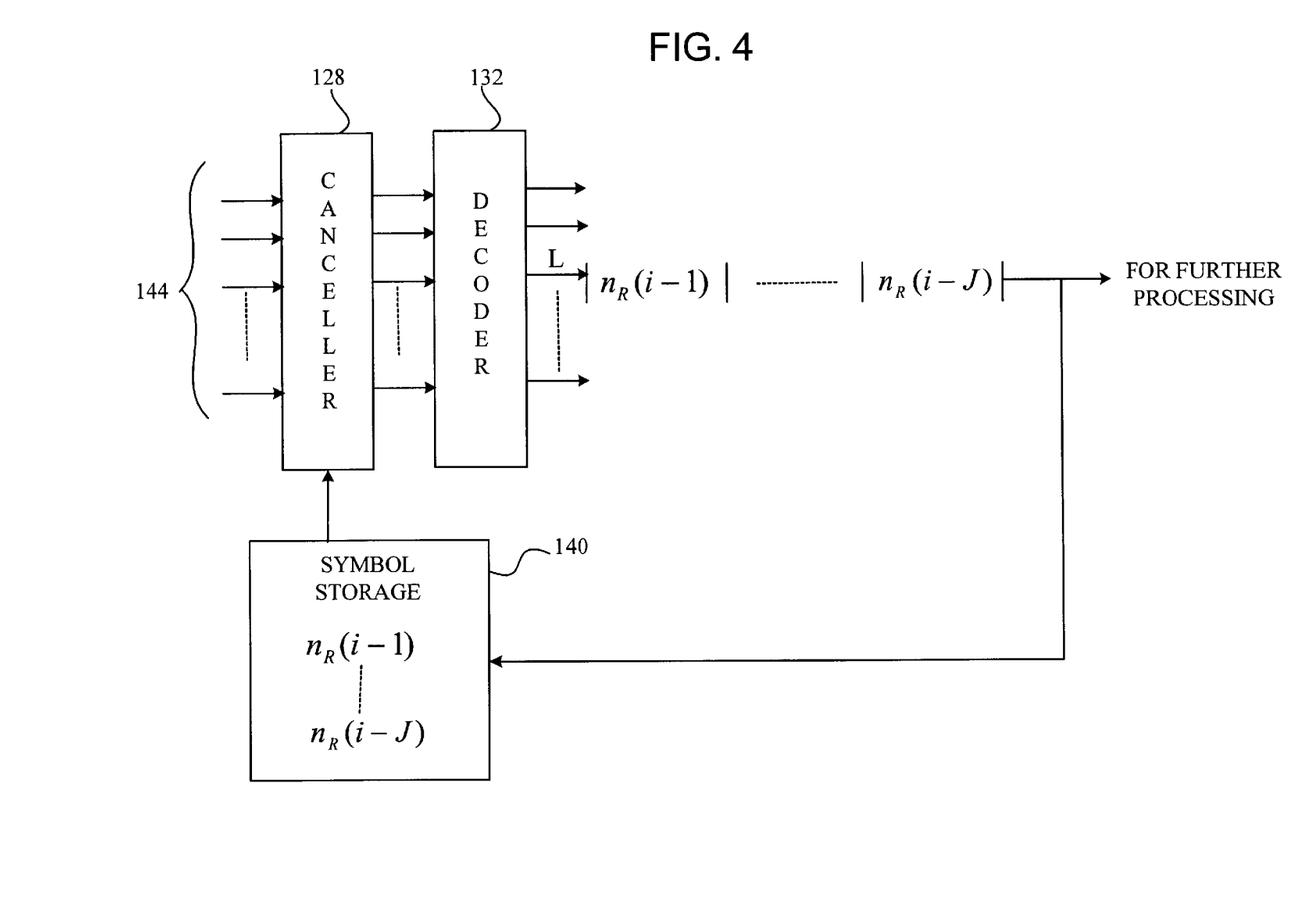
FIG. 4 is a diagram illustrating exemplary receiver components in accordance with the preferred embodiments.

In a preferred embodiment, shown in FIG. 4, a canceller 128 improves the signal-to-noise ratio preferably by reducing or eliminating the narrowband noise interference on a per bin basis. The output of the canceller 128 is preferably further processed by a decoder 132 such as by a slicer. The decoder 132 preferably provides decoder errors, which are stored in a storage device, referred to as a symbol storage unit 140. The a symbol storage 140 unit may include any device in which the decoder error(s) may be stored in such as, for example, but not limited to, a random access memory ("RAM"), a buffer, and an electrically erasable programmable read-only memory ("EEPROM"). The canceller 128 may then utilize the stored decoder errors and the output 144 of the FEQ to reduce narrowband interference on a per bin basis.

Assume, for example, bin L (shown in FIG. 4) has a low signal-to-noise ratio. To increase the signal-to-noise ratio, the canceller 128 has determined to reduce the noise, thus increasing the signal-to-noise ratio of bin L. To reduce the noise of bin L, output from the decoder 132 is added with a noise estimate and stored in the symbol storage device. The data stored in the symbol storage 140 may include up to J decoder errors originating from the decoder 132 taken from bin L. The decoder errors or symbols stored in the symbol storage 140 may be used to develop adaptive filter taps to reduce undesired interference. This may be accomplished by filtering the decoder errors with an adaptive filter having J taps. Once filtered, the interference on bin L is preferably reduced. The noise cancelled data from bin L may be used in further processing such as a Reed Solomon/ATM decoder (not shown).

Figure 5:
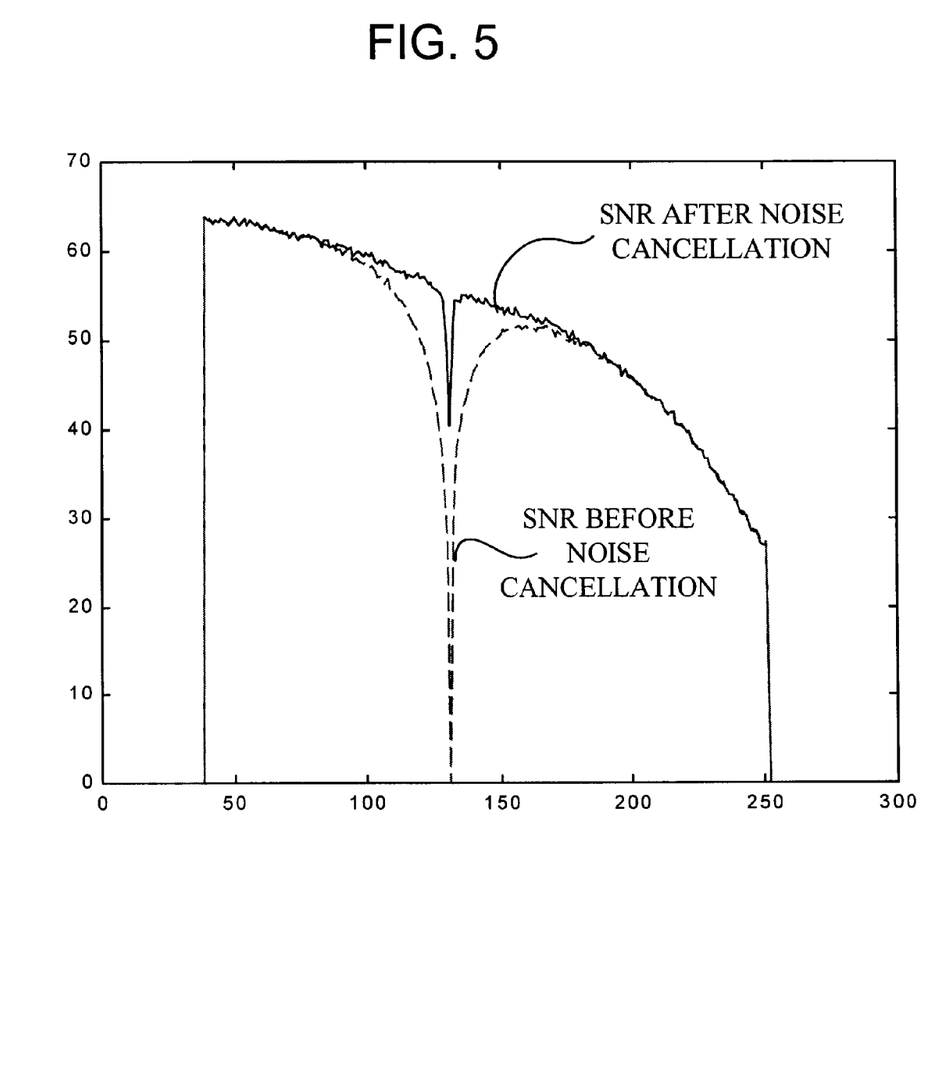
FIG. 5 is a plot of signal-to-noise ratio to bin number of a receiver in accordance with preferred embodiments.

FIG. 5 is a simulation output in accordance with the preferred embodiments. Speech data (i.e., a source of noise in this example) was modulated onto a carrier wave at 560 kHz, which for this example is equivalent to bin 130. After receiving the carriers on the bins between approximately 50 and 250 the noise added to bin 130 (i.e., approximately 560 kHz) was so great that the signal-to-noise ratio was near zero. Additionally, the signal-to-noise ratio exhibited a large "roll off" reducing the signal-to-noise ratio of surrounding bins. Such a bin may be deactivated in ordinary DMT communications. However, utilizing the system and methods described herein, the output of the canceller increased the signal-to-noise ratio for bin 130 and the surrounding bins. By increasing the signal-to-noise ratio of bin 130, the receiver may use bin 130 to transfer data to and from a transmitter.

The system and method of the preferred embodiments is directed to improving the signal-to-noise ratio in frequency spectrum regions where narrowband interference may be present. The system and method of the preferred embodiments includes reducing the narrowband interference by determining a noise estimate. In accordance with the noise estimate and output of a frequency domain equalizer or equivalent, a noise-cancelled output may be obtained.

It should be understood that the programs, processes, methods and systems described herein are not related or limited to any particular type of receivers or network system (hardware or software), unless indicated otherwise. Various types of general purpose or specialized systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method reducing narrowband interference may be embodied in a computer program product that includes a computer usable medium. For example, such as, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method of increasing a signal-to-noise ratio for at least one carrier in a multicarrier transceiver comprising steps of:

receiving and storing at least one decoder error for the at least one carrier;

determining at least one adaptive filter tap for each of the at least one carrier in accordance with the at least one decoder error, wherein at least one adaptive filter tap comprises the minimization of the means squared error;

determining a noise estimate relating to the at least one decoder error and the at least one adaptive filter tap;

receiving an equalizer output;

determining a signal having increased signal-to-noise ratio in response to the noise estimate and the equalizer output; and wherein the minimization of the mean squared error is performed in accordance with the relation: $\xi = E\{(x(i) - f(n)y(i) + h_k^*\hat{e}(i))^2\}$ where $x(i)$ is a known transmitted symbol such as during receiver training and/or the decision for the current constellation, where $f(n)$ is the equalizer coefficient corresponding to the nth bin, where $y(i)$ is a FFT output of the corresponding nth bin, and where $h_k^*\hat{e}(i)$ is the filtering of an uncanceled decoder error $\hat{e}(i)$ with the filter taps $h_k$.

2. The method of claim 1, wherein the at least one decoder error is an uncanceled decoder error.

3. The method of claim 1, wherein the minimization of the mean squared error is performed in accordance with the relation: $h_{k-1} = h_k - \alpha(x(i) - f(n)y(i) + h_k^*\hat{e}(i))\text{conj}(\hat{e}(i))$ where $h_k$ is the current filter tap, where $\alpha$ is a corrective coefficient, where $h_k^*\hat{e}(i)$ is the filtering of an uncanceled decoder error $\hat{e}(i)$ with filter coefficients $h_k$, where $\hat{e}(i)$ is the uncanceled decoder error for the symbol i of a total J symbols, and where $\text{conj}(\hat{e}(i))$ is the complex conjugate of the uncanceled decoder error for a symbol i of a total J symbols.

4. The method of claim 1, wherein the step of determining an adaptive filter tap is performed in accordance with the relationship:

$$h_{k+1} = \alpha h_k + (1 - \alpha)\frac{\hat{e}(i)}{\hat{e}(i-1)},$$

where $\alpha$ is the corrective coefficient, where $h_k$ is the adaptive filter tap for symbol i, and where $\hat{e}(i)$ is an uncanceled decoder error for the symbol i.

5. A computer readable medium having stored therein instructions for causing a central processing unit to execute the method of claim 1.

* * * * *